United States Patent
Hill et al.

(10) Patent No.: US 11,174,352 B2
(45) Date of Patent: Nov. 16, 2021

(54) POLYMERS OF POLYOXOMETALATES AND HYDROXY-TERMINATED MONOMER UNITS AND USES IN DEGRADING NOXIOUS AGENTS

(71) Applicant: Emory University, Atlanta, GA (US)

(72) Inventors: Craig Hill, Atlanta, GA (US); Kevin Sullivan, Atlanta, GA (US)

(73) Assignee: Emory University, Atlanta, GA (US)

( * ) Notice: Subject to any disclaimer, the term of this patent is extended or adjusted under 35 U.S.C. 154(b) by 473 days.

(21) Appl. No.: 16/061,327

(22) PCT Filed: Dec. 9, 2016

(86) PCT No.: PCT/US2016/065776
§ 371 (c)(1),
(2) Date: Jun. 11, 2018

(87) PCT Pub. No.: WO2017/146801
PCT Pub. Date: Aug. 31, 2017

(65) Prior Publication Data
US 2019/0040208 A1    Feb. 7, 2019

Related U.S. Application Data

(60) Provisional application No. 62/265,746, filed on Dec. 10, 2015.

(51) Int. Cl.
| | | |
|---|---|---|
| C08G 83/00 | (2006.01) | |
| A62D 3/35 | (2007.01) | |
| A62D 3/38 | (2007.01) | |
| A62D 101/02 | (2007.01) | |
| A62D 101/26 | (2007.01) | |

(52) U.S. Cl.
CPC .......... *C08G 83/003* (2013.01); *A62D 3/35* (2013.01); *A62D 3/38* (2013.01); *C08G 83/001* (2013.01); *C08G 83/004* (2013.01); *A62D 2101/02* (2013.01); *A62D 2101/26* (2013.01); *C08G 2261/37* (2013.01)

(58) Field of Classification Search
CPC .... C08G 83/00; C08G 83/003; C08G 83/001; C08G 83/004; C08G 2261/37; A62D 3/35; A62D 3/38; A62D 2101/02; A62D 2101/26
USPC ........................................................ 588/317
See application file for complete search history.

(56) References Cited

U.S. PATENT DOCUMENTS

| | | | | |
|---|---|---|---|---|
| 5,585,510 A * | 12/1996 | Mazany | ................... | C07F 9/38 556/20 |
| 6,713,076 B1 * | 3/2004 | Hill | ........................ | A61L 9/00 424/402 |
| 7,655,594 B2 * | 2/2010 | Okun | ...................... | A62D 3/30 502/302 |

FOREIGN PATENT DOCUMENTS

| | | | |
|---|---|---|---|
| GN | 103923282 A | 4/2018 | |
| WO | 2001034279 | 5/2001 | |
| WO | 2015040033 | 3/2015 | |
| WO | WO-2015040033 A3 * | 6/2015 | ........... C07D 213/22 |

OTHER PUBLICATIONS

Barba et al. Neutral 1,3-Diindolylureas for Nerve Agent Remediation, Chem. Eur. J. 2013, 19, 1586-1590.
Bromberg et al. Nucleophilic Polymers and Gels in Hydrolytic Degradation of Chemical Warfare Agents, ACS Appl. Water. Interfaces 2015, 7, 22001-22011.
Carraro et al. Hybrid Materials Based on the Embedding of Organically Modified Transition Metal Oxoclusters or Polyoxometalates into Polymers for Functional Applications: A Review, Materials 2014, 7, 3956-3989.
Decoste et al. Metal-Organic Frameworks for Air Purification of Toxic Chemicals, Chern. Rev. 2014, 114, 5695-5727.
Guo et al. Broad-Spectrum Liquid- and Gas-Phase Decontamination of Chemical Warfare Agents by One-Dimensional Heteropolyniobates, Angew. Chem. Int. Ed. 2016, 55, 7403-7407.
Hernandez et al. N-[Tris(hydroxymethyl)methyl]benzenecarboxamides: A Convenient Route to Polyhydroxylated Dendritic Cores, J. Org. Chem. 1999, 64, 6905-6906.
Huang et al. Synthesis, crystal structure and spectroscopic studies of a series of hexavanadate hybrids with multiple functional groups, Inorg. Chem. Front., 2017,4, 165.
Huo et al. Synthesis and characterization of Lidqvist-type polyoxometalate-porphyrin copolymers, Electrochimica Acta 179, 2015, 326-355.
Kinnan et al. Nerve Agent Degradation with Polyoxoniobates, Eur. J. Inorg. Chem. 2014, 2361-2367.
Mekelburger et al. Dendrimers, Arborols, and Cascade Molecules: Breakthrough into Generations of New Materials, Angew. Chem. Int. Ed. Engl. 1992, 31,12, 1571.
Mondloch et al.. Destruction of chemical warfare agents using metal-organic frameworks, Nat Mater. 2015, 14(5):512-6.
Morgan et al. Synthesis of Carbohydrate-Linked Poly(polyoxometalate) Poly(amido)amine Dendrimers, Journal of Polymer Science: Part A: Polymer Chemistry, vol. 43, 3059-3066 (2005).
Newkome et al. Dendrimers Derived from 1 to 3 Branching Motifs, Chem. Rev. 2010, 110, 6338-6442.
Piana et al. Organophosphorus chemical warfare agent simulant DMMP promotes structural reinforcement of urea-based chiral supramolecular gels, RSC Adv., 2015, 5, 12287.

(Continued)

*Primary Examiner* — Edward M Johnson
(74) *Attorney, Agent, or Firm* — Emory Patent Group (57) ABSTRACT

This disclosure relates to polymers and polymer compositions having monomer units of polyoxometalates and monomer units comprising hydroxy-terminated molecules such as branched molecules or dendrimers and uses in degradation, decontamination, and deodorization. In certain embodiments, the hydroxy-terminated branched molecules or dendrimers comprise terminal 1,1-tris(hydroxymethyl)methyl or 1,1,1-tris(hydroxyalkyl)methyl groups. In certain embodiments, the hydroxy-terminated molecule is N,N',N"-tris[tris(hydroxymethyl) methyl]-1,3,5-benzenetricarboxamide.

18 Claims, 5 Drawing Sheets

(56) References Cited

OTHER PUBLICATIONS

Pradeep et al. Design and Synthesis of "Dumb-bell" and "Triangular" Inorganic-Organic Hybrid Nanopolyoxometalate Clusters and Their Characterisation through ESI-MS Analyses, Chem. Eur. J. 2011, 17, 7472-7479.
Steens et al. Hydrolytic cleavage of DNA-model substrates promoted by polyoxovanadates, Dalton Trans., 2010, 39, 585-592.
Tong et al. Reversible Light-Driven Polymerization of Polyoxometalate Tethered with Coumarin Molecules, Chem. Eur. J. 2014, 20, 1500-1504.
Zeng et al. Poly(polyoxometalate) Dendrimers: Molecular Prototypes of New Catalytic Materials, Angew. Chem. 2000, 112, Nr. 10, 1842.
Zhu et al. Alginate Hydrogel: A Shapeable and Versatile Platform for in Situ Preparation of Metal-Organic Framework-Polymer Composites, ACS Appl. Mater. Interfaces 2016, 8, 17395-17401.

\* cited by examiner

POLYMERS OF POLYOXOMETALATES AND HYDROXY-TERMINATED MONOMER UNITS AND USES IN DEGRADING NOXIOUS AGENTS

CROSS-REFERENCE TO RELATED APPLICATIONS

This application is the National Stage of International Application No. PCT/US2016/065776 filed Dec. 9, 2016, which claims the benefit of U.S. Provisional Application No. 62/265,746 filed Dec. 10, 2015. The entirety of each of these applications is hereby incorporated by reference for all purposes.

STATEMENT REGARDING FEDERALLY FUNDED RESEARCH

This invention was made with government support under W911NF-12-1-0136 awarded by the Army Research Office. The government has certain rights in the invention.

BACKGROUND

Chemical warfare agents are toxic chemicals that have either lethal or incapacitating effects on humans. Organophosphorus (OP) nerve agents are a class of warfare agents with high toxicity and potential for large-scale release. Traditional materials for decomposing OP nerve agents such as activated carbon are effective for sequestration but are not ideal for decontamination as incorporation of catalytically active functional groups into these materials is challenging. Thus, there is a need to identify improved compositions and methods for degradation or decontamination of OP nerve agents.

Certain polyoxometalates (POMs) have been reported for the degradation of noxious agents. Mondloch et al. report destruction of chemical warfare agents using metal-organic frameworks. Nature Materials, 14, 512-516 (2015). DeCoste et al. report metal-organic frameworks for air purification of toxic chemicals. Chemical Reviews 114, 5695-5727 (2014). Kinnan et al. report nerve agent degradation with polyoxoniobates. European Journal of Inorganic Chemistry 2014, 2361-2367 (2014). Guo et al. report decontamination of chemical warfare agents by heteropolyniobates. Angew Chem Int Ed Engl., 2016, 55(26):7403-7.

Carraro et al. report hybrid materials based on embedding transition metal oxoclusters or polyoxometalates into polymers. Materials, 2014, 7, 3956-3989. Bromberg et al. report gels in hydrolytic degradation of chemical warfare agents. ACS Appl. Mater. Interfaces, 2015, 7 (39): 22001-22011.

References cited herein are not an admission of prior art.

SUMMARY

This disclosure relates to polymers and polymer compositions having monomer units of polyoxometalates and monomer units comprising hydroxy-terminated molecules such as branched molecules or dendrimers and uses in degradation, decontamination, and deodorization. In certain embodiments, the hydroxy-terminated branched molecules or dendrimers comprise terminal 1,1-tris(hydroxymethyl) methyl or 1,1,1-tris(hydroxyalkyl)methyl groups. In certain embodiments, the hydroxy-terminated molecule is N,N',N''-tris[tris(hydroxymethyl) methyl]-1,3,5-benzenetricarboxamide.

In certain embodiments, the disclosure relates to polymers having monomers comprising hydroxy-terminated branched molecules or dendrimers and units of metal complexes wherein the metal complexes comprise two or more metals atoms that coordinate with oxygen atoms in the hydroxy-terminated branched molecules or dendrimers.

In certain embodiments, monomer units comprise a hydroxy-terminated branched molecule having of the following structure:

wherein, A is nitrogen, carbon, or aromatic or non-aromatic optionally heterocyclic ring, X is a linking group or [Y]q, Y is individually and independently at each occurrence, CH2, NH, O, S, —(C=O)—, m is 1, 2, 3, 4, 5, or 6, n is 1 to 22, and p is 2 or 3, q is 1, 2, 3, 4, 5, 6, 7, or 8. In certain embodiments, n is 1 or 2. In certain embodiments, m is 2, 3, or 4. In certain embodiments, m is 3 or more. In certain embodiments, A is phenyl.

In certain embodiments, monomer units comprising hydroxy-terminated branched molecules are N,N'-bis[tris(hydroxymethyl)methyl]-5-tert-butyl-1,3-benzenedicarboxamide or oxybis[N-tris(hydroxymethyl)methyl]-4,4'-benzenedicarboxamide.

In certain embodiments, monomer units comprising carboxyl-terminated branched molecules or dendrimers are carboxyl groups containing an oxo (C=O) and terminal-hydroxy (OH) groups.

In certain embodiments, this disclosure contemplates polymers disclosed herein wherein the metal complex has the following formula:

M$_p$M'$_q$O$_x$(OH)$_n$ wherein,

M is a metal atom typically a d0 center, such as tungsten (W), molybdenum (Mo), vanadium (V), niobium (Nb), tantalum (Ta), or combinations thereof;

M' is one or more redox active metals atoms selected from f-block elements, d-block elements, or combinations thereof;

p is an integer from 0 to 50;

q is an integer from 0 to 40; wherein the sum of p and q is two or more;

x is an integer from 0 to 400; and n is an integer from 0 to 200.

In certain embodiments, the metal complex comprises (Co$_4$), (Ni$_4$), (Ni$_5$), (W$_{10}$), (Mo$_7$), (V$_{10}$), (Ru$_3$), (Ru$_4$), (CoMo$_6$), (Co$_2$Mo$_{10}$)  (SiW$_9$), (SiW$_{10}$), (Co$_4$SiW$_9$), (RuSiW$_{11}$), (GeW$_9$), (RuGeW$_{11}$), (PW$_9$), (AsW$_9$), (GeNb$_{12}$), or combinations thereof.

In certain embodiments, M' is a transition metal selected from titanium, chromium, manganese, cobalt, iron, nickel, copper, rhodium, silver, iridium, palladium, platinum, mercury, ruthenium, and vanadium.

In certain embodiments, this disclosure relates to compositions comprising a polymer disclosed herein and a quaternary ammonium cation. In certain embodiments, the quaternary ammonium cation is selected from tetramethylammonium, tetraethylammonium, tetrapropylammonium, tetrabutylammonium, tetrahexylammonium, tetraoxtylammonium, distearyl dimethyl ammonium, paraquat, diquat, benzalkonium, benzethonium, methylbenzethonium, cetalkonium, cetylpyridinium, cetrimonium, cetrimide, dofanium, stearalkonium, choline, denatonium, cocamidopropyl betaine, and carnitine.

In certain embodiments, the composition further comprises a polar aprotic solvent and/or water.

In certain embodiments, this disclosure relates to articles comprising a solid substrate and a composition disclosed herein. In certain embodiments, the solid substrates is a piece of clothing, fabric, string, matrix, collagen, leather, paper, polymer, plastic, glass, wood, metal surface, cement, rock, or solid aggregate of minerals or mineraloids.

In certain embodiments, this disclosure relates to methods of decomposing or oxidizing a compound comprising exposing a composition disclosed herein to an agent under conditions such that the agent is oxidized or hydrolyzed by the metal complexes. In certain embodiments, the agent to be decomposed or oxidized comprises a thiol group, nitrile group, an ester, or phosphate ester group.

In certain embodiments, the agent is a chemical warfare agent selected from sarin (propan-2-yl methylphosphonofluoridate), soman (3,3-dimethylbutan-2-yl methylphosphonofluoridate), cyclosarin (cyclohexyl methylphosphonofluoridate), tabun (ethyl N,N-Dimethylphosphoramidocyanidate), VX (O-ethyl S-[2-(diisopropylamino)ethyl] methylphosphonothioate), mustards, bis(2-chloroethyl)sulfide, 1,2-bis-(2-chloroethylthio)-ethane, bis-(2-chloroethylthioethyl)-ether, lewisite (2-chloroethenylarsonous dichloride), phosgene, diphosgene, cyanogen chloride, and hydrogen cyanide.

DETAILED DISCUSSION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent.

As used in this disclosure and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") have the meaning ascribed to them in U.S. Patent law in that they are inclusive or open-ended and do not exclude additional, unrecited elements or method steps. "Consisting essentially of" or "consists essentially" or the like, when applied to methods and compositions encompassed by the present disclosure refers to compositions like those disclosed herein that exclude certain prior art elements to provide an inventive feature of a claim, but which may contain additional composition components or method steps, etc., that do not materially affect the basic and novel characteristic(s) of the compositions or methods, compared to those of the corresponding compositions or methods disclosed herein.

As used herein, the term "polymer" refers to a macromolecular structure comprising repeating molecular arrangements referred to as "monomers" or "units." "Polymer" is intended to encompass polymers that contain more than one or more than two repeating molecular arrangement sometimes referred to as "co-polymers."

Branched Molecules and Dendrimers

Figure 5:
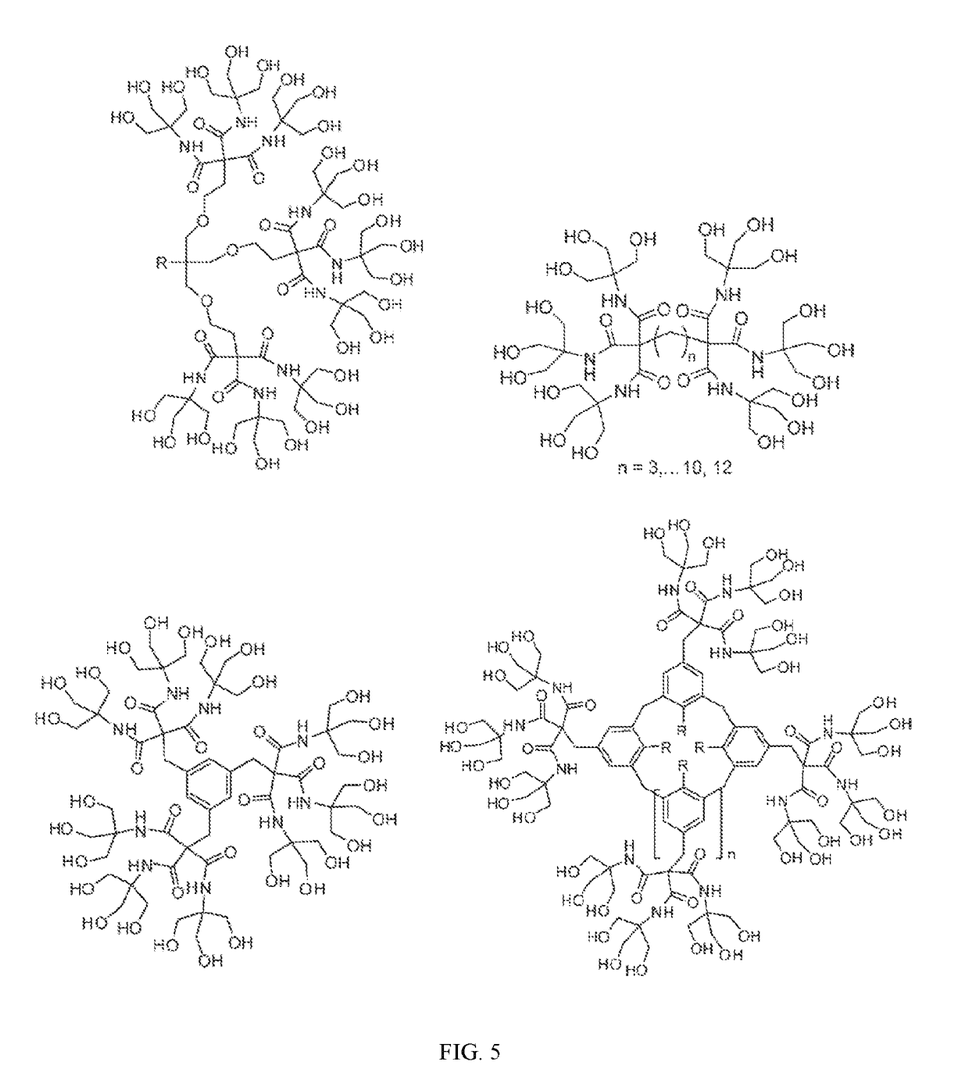
FIG. 5 illustrates hydroxy-terminal dendrimers. See Newkome & Shreiner, Dendrimers Derived from 1 [to] 3 Branching Motifs, Chem. Rev. 2010, 110, 6338-6442.
Figure 6:
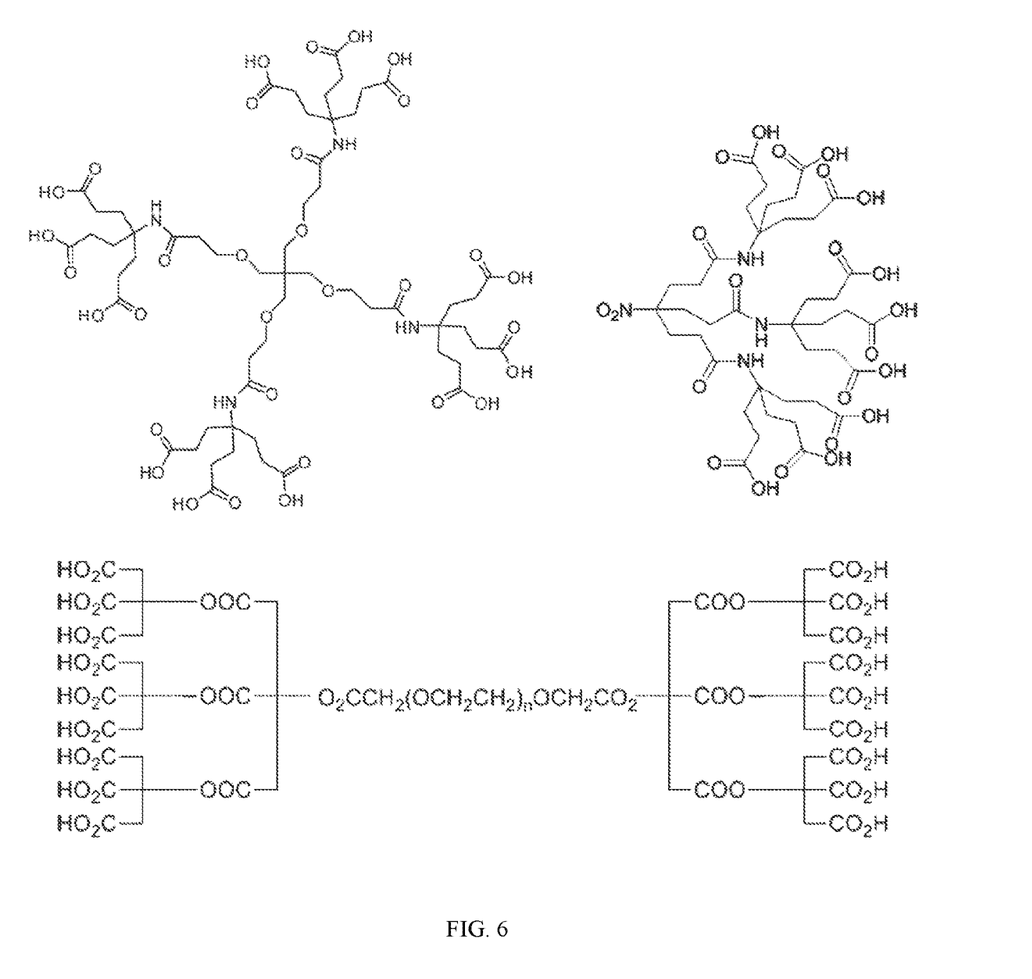
FIG. 6 illustrates carboxyl-terminal dendrimers. See Newkome & Shreiner, Dendrimers Derived from 1 [to] 3 Branching Motifs, Chem. Rev. 2010, 110, 6338-6442.

This disclosure relates to polymers and polymer compositions having monomer units comprising a hydroxy-terminated branched molecules, dendrimers, arborols, or combinations thereof. As used herein, the term "dendrimer" or "arborol" can be used interchangeably to refer to compounds with repeating molecular arrangements having branches, e.g., a carbon substituted with at least three substituents, which is typically the result of synthesis from a core molecule. The synthesis may be in two or more directions. The dendrimer product can result in 1 to 2 branching patterns or 1 to 3 branching patterns or 1 to 1 and 2 branching patters as illustrated in Newkome & Shreiner, Dendrimers Derived from 1 [to] 3 Branching Motifs, Chem. Rev. 2010, 110, 6338-6442. See also Mekelburger et al., (1992), Dendrimers, Arborols, and Cascade Molecules: Breakthrough into Generations of New Materials. Angew. Chem. Int. Ed. Engl., 31: 1571-1576.

Figure 1A:
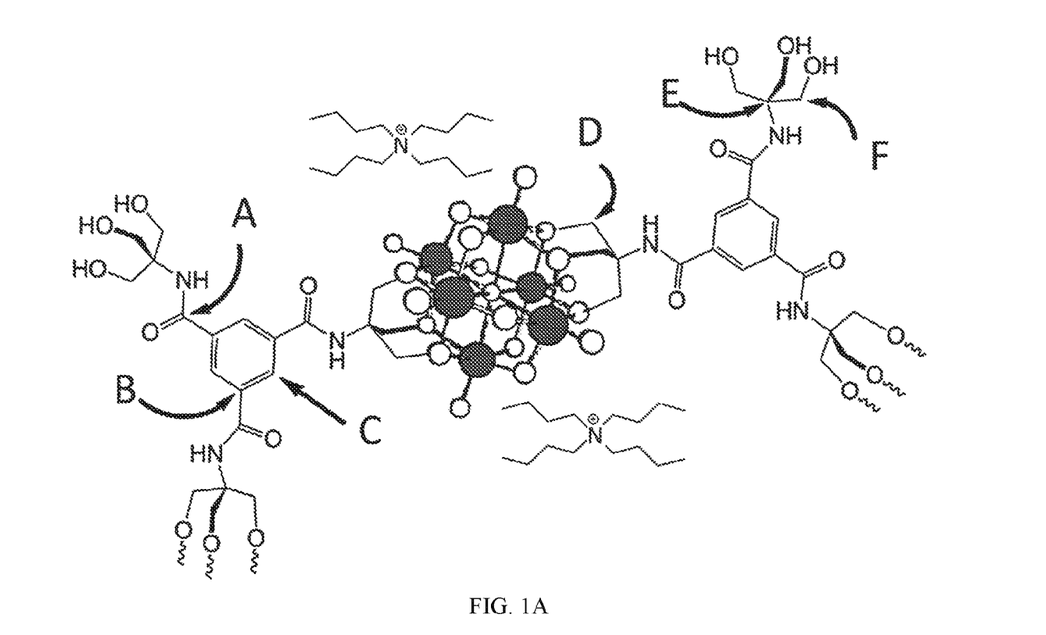
FIG. 1A illustrates representative structural unit of Q-BTAV$_6$ and resulting gel after addition of DMF. The spheres represent VV and $O^{2-}$.
Figure 1B:
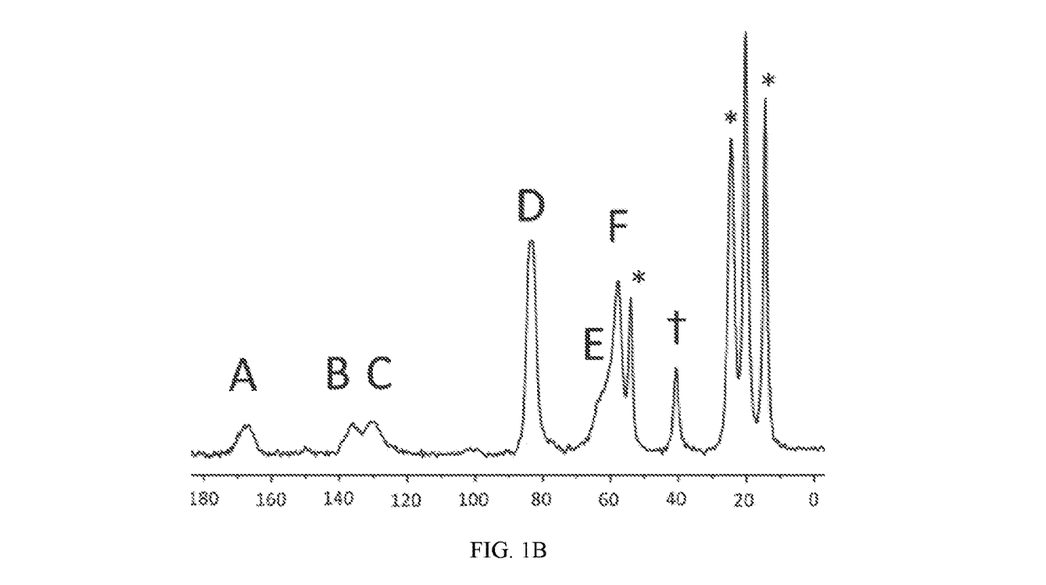
FIG. 1B illustrates CP-MAS $^{13}$C NMR of Q-BTAV$_6$. Residual DMF peak (†) and tetrabutylammonium peaks (*) are indicated.
Figure 2:
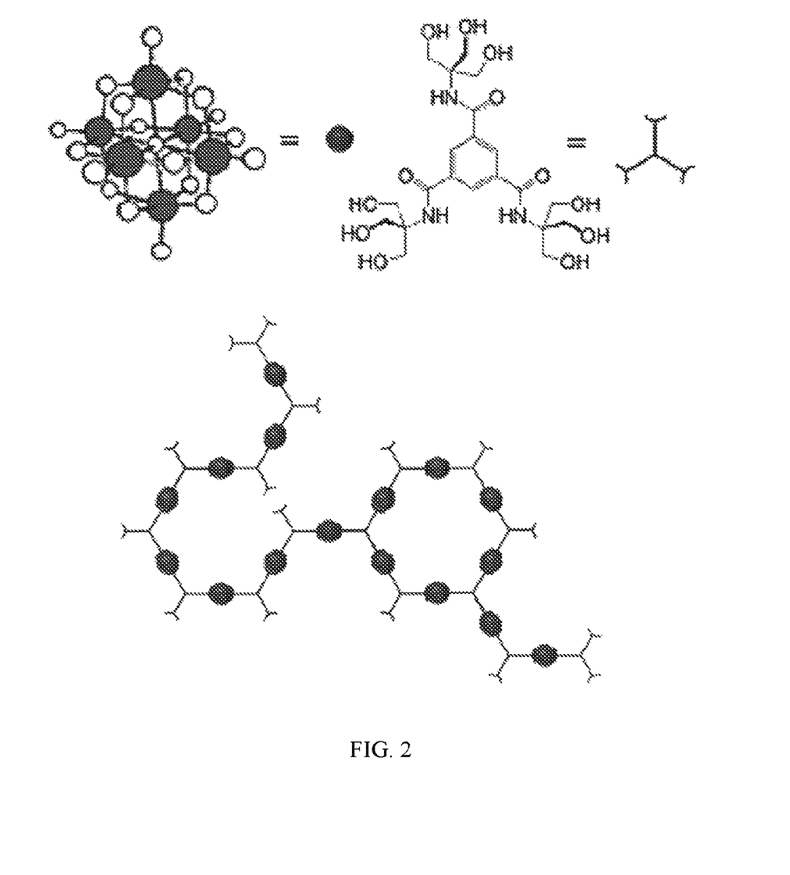
FIG. 2 illustrates the polymer Q-BTAV$_6$. Solid spheres in the polymer network indicate hexavanadate [VV$_6$O$_{13}$(OR)$_6$)]$^{2-}$ (R=trisBTA) linkers) clusters. Each cluster is associated with two tetrabutylammonium cations, which are omitted for clarity.
Figure 3:
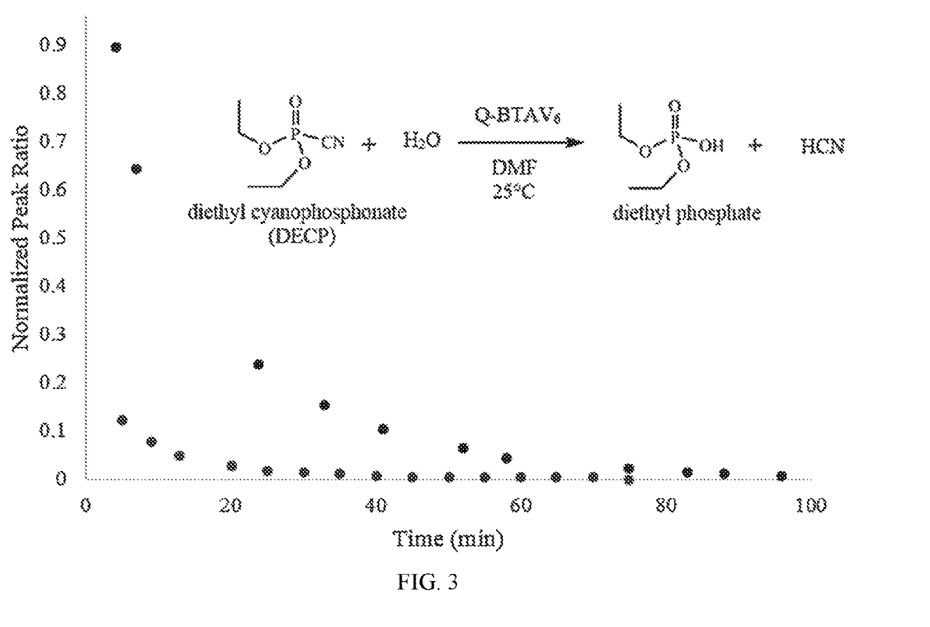
FIG. 3 illustrates and shows data on the hydrolysis of diethyl cyanophosphonate catalyzed by Q-BTAV$_6$ in DMF. Q-BTAV$_6$ (5.7 mg; 3.6 µmol based on number of hexavanadate units) and DECP (66 µmol) were added to DMF, and 900 µmol water was added to initiate the hydrolysis. Reactions were monitored by $^{31}$P NMR. The control reaction was run using the same conditions as the catalyzed reaction but with the omission of Q-BTAV$_6$.
Figure 4:
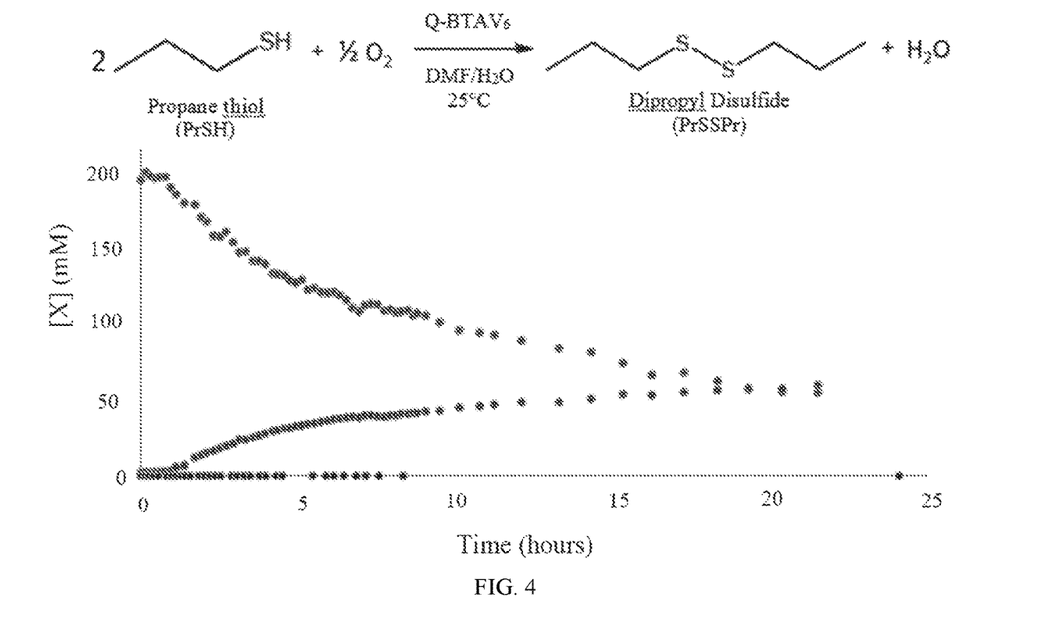
FIG. 4 illustrates and shows data on the oxidation of propane thiol to dipropyl disulfide catalyzed by Q-BTAV$_6$. Reaction progress is measured by GC analysis. 3.0 mL wet DMF, 220 mM PrSH, 120 mM 1,3-dichlorobenzene as an internal standard, 7.6 mg Q-BTAV6, 100% $O_2$. The mole ratio of reactant to product is 127. Control reaction was run under identical conditions but with the omission of Q-BTAV$_6$. As reaction proceeds, a color change is observed from orange-yellow to dark green as the hexavanadate units are reduced.

Hernandez et al. report synthesis of N-[tris(hydroxymethyl)methyl]benzene-carboxamides. J Org Chem, 64, 6905-6906 (1999). The branched molecule, N,N',N"-tris[tris(hydroxymethyl)methyl]-1,3,5-benzenetricarboxamide, as illustrated in FIG. 1, has repeating molecular arrangements represented by branched carbons with hydroxymethyl groups that emanate from a central phenyl ring; thus, N,N',N"-tris[tris(hydroxymethyl)methyl]-1,3,5-benzenetricarboxamide is a dendrimer. In certain embodiments, the hydroxy-terminated dendrimer comprises terminal 1,1-tris(hydroxymethyl)methyl or 1,1,1-tris(hydroxyalkyl)methyl groups.

In certain embodiments, the monomer units comprising a hydroxy-terminated dendrimer have of the following structure:

wherein, A is an aromatic or non-aromatic optionally heterocyclic ring, X is a linking group or $[Y]_q$, Y is individually and independently at each occurrence, $CH_2$, NH, O, S, $-(C=O)-$, m is 1, 2, 3, 4, 5, or 6, n is 1 to 22, and p is 2 or 3, q is 1, 2, 3, 4, 5, 6, 7, or 8. In certain embodiments, n is 1 or 2. In certain embodiments, m is 2, 3, or 4. In certain embodiments, m is 3 or more. In certain embodiments, A is phenyl.

As used herein, a "linking group" refers to any variety of molecular arrangements that can be used to bridge to molecular moieties together. An example formula may be $-R_m-$ wherein R is selected individually and independently at each occurrence as: $-CR_mR_m-$, $-CHR_m-$, $-CH-$, $-C-$, $-CH_2-$, $-C(OH)R_m$, $-C(OH)(OH)-$, $-C(OH)H$, $-C(Hal)R_m-$, $-C(Hal)(Hal)-$, $-C(Hal)H-$, $-C(N3)R_m-$, $-C(CN)R_m-$, $-C(CN)(CN)-$, $-C(CN)H-$, $-C(N_3)(N_3)-$, $-C(N_3)H-$, $-O-$, $-S-$, $-N-$, $-NH-$, $-NR_m-$, $-(C=O)-$, $-(C=NH)-$, $-(C=S)-$, $-(C=CH_2)-$, which may contain single, double, or triple bonds individually and independently between the R groups. If an R is branched with an $R_m$ it may be terminated with a group such as $-CH_3$, $-H$, $-CH=CH_2$, $-CCH$, $-OH$, $-SH$, $-NH_2$, $-N_3$, $-CN$, or -Hal, or two branched Rs may form a cyclic structure. It is contemplated that in certain instances, the total Rs or "m" may be less than 100 or 50 or 25 or 10. Examples of linking groups include bridging alkyl groups and alkoxyalkyl groups.

In certain embodiments, the disclosure contemplates that the compositions may have mixtures of hydroxy-terminated branched molecules such as mixtures of N,N',N"-tris[tris(hydroxymethyl)methyl]-1,3,5-benzenetricarboxamide and two-way branching molecules such as N,N'-bis[tris(hydroxymethyl)methyl]-5-tert-butyl-1,3-benzenedicarboxamide or oxybis[N-tris(hydroxymethyl)methyl]-4,4'-benzenedicarboxamide.

Polyoxometalates

This disclosure relates to polymers and polymer compositions having units of polyoxometalates. As used herein, "polyoxometalate" refers to a polyatomic anion that contains a central metal atom/atoms and metal oxyanions linked together by shared oxygen atoms. The central metal atoms are typically Mo, W, V, Nb, or Ta. Polyoxometalate is intended to include isopolymetalates, composed of only one kind of metal, and heteropolymetalates, composed of a mixture of central metal(s) and oxyanions.

In certain embodiments, the polyoxometalate is a metal complex having the following formula:

wherein

M is a metal atom typically a $d_0$ center, such as tungsten (W), molybdenum (Mo), vanadium (V), niobium (Nb), tantalum (Ta), or combinations thereof, M' is one or more redox active metals atoms selected from f-block elements, d-block elements, or combinations thereof;

p is an integer from 0 to 50;

q is an integer from 0 to 40; wherein the sum of p and q is two or more;

x is an integer from 0 to 400; and n is an integer from 0 to 200.

In certain embodiments, wherein the sum of x and n is 4 or more.

In certain embodiments, wherein the metal complex comprises $(Co_4)$, $(Ni_4)$, $(Ni_{15})$, $(W_{10})$, $(Mo_7)$, $(V_{10})$, $(Ru_3)$, $(Ru_4)$, $(CoMo_6)$, $(Co_2Mo_{10})$ $(SiW_9)$, $(SiW_{10})$, $(Co_4SiW_9)$, $(RuSiW_{11})$, $(GeW_9)$, $(RuGeW_{11})$, $(PW_9)$, $(AsW_9)$, $(GeNb_{12})$, or combinations thereof.

In certain embodiments, M' is a transition metal selected from titanium, chromium, manganese, cobalt, iron, nickel, copper, rhodium, silver, iridium, palladium, platinum, mercury, ruthenium, and vanadium.

Tunable Gelating Networks to Entrap, Detect, and Catalytically Destroy Toxic Agents Disclosed herein is a polyanionic polymer is comprised of covalently functionalized hexavanadate clusters and hydrogen-bonding tricarboxamides (BTAs) with the quaternary ammonium cation (Q) (tetrabutylammonium counterions)

(Q-BTAV$_6$) and forms gels when exposed to select organic compounds, including the nerve agent simulant dimethyl methylphosphonate. Q-BTAV$_6$ catalyzes both hydrolysis of the organophosphorus nerve agent simulant diethylcyanophosphonate and oxidation of the representative odorant propanethiol. The oxidation reaction results in a color change in the polymer from red to green, providing built-in colorimetric detection. Facile cation exchange (e.g. Li+ for Q+) reveals the potential for modifying this type of polymer and tailoring its response to a variety of target compounds. Q-BTAV$_6$ is one representative of a class of materials that can simultaneously isolate, detect and destroy deleterious compounds.

Hybrid organic/inorganic networks were constructed based on polyoxometalates (POMs). The behavior of these hybrid polymers towards capturing and destroying harmful agents is reported. POMs are oligomeric aggregates of metal cations bridged by oxide anions. These hybrid organic/inorganic POMs allow for a broad array of functionalities to be designed and incorporated, facilitating their tailoring towards specific targets.

The catalytically active POM-based polymers form organogels when exposed to polar organic compounds, including OP agent analogues. This material has the ability to entrap select toxic compounds by gelation, catalyze their hydrolytic or air-based oxidative decontamination, and detect the redox reactions via rapid color change. Furthermore, it is robust and highly tunable to particular targets and applications.

The tetrabutylammonium hexavanadate salt of the polymer, $[(n\text{-}C_4H_9)_4N]_{2n}[(V_6O_{13})_n[((OCH_2)_3CNHCO)_3C_6H_3]_x[((OCH_2)_3CNHCO)_2((HOCH_2)_3CNHCO)C_6H_3]_y]$ (Q-BTAV$_6$), detects and catalyzes oxidation under mild conditions a common odorant, propanethiol (PrSH). Diethyl cyanophosphonate (DECP) is a mimic of tabun. Q-BTAV$_6$ is also capable of sequestration and hydrolytic decontamination of a G-series chemical warfare agent analogue, diethyl cyanophosphonate (DECP).

Synthesis of Q-BTAV$_6$ proceeds through an esterification reaction between $C_6H_3(CONHC(CH_2OH)_3)_3$ (trisBTA) and the $Q^-$ salt of decavanadate, $[Q]_3H_3V_{10}O_{28}$. A single peak in the solution $^{51}$V NMR at −500 ppm confirms the presence of intact hexavanadate units containing symmetrical triester groups of the resulting Q-BTAV$_6$. Each vanadium atom in the esterified hexavanadate unit is symmetrically identical, so the single peak in $^{51}$V NMR spectrum supports the presence of discrete hexavanadate clusters. Each bis(triester-hexavanadate) bears a $2^-$ charge, compensated by two $Q^+$ counter cations. A comparison between the V-O stretching frequencies in the infrared spectrum of the monomeric hexavanadate $[(n\text{-}C_4H_9)_4N]_{2[}(V_6O_{13})$ $[((OCH_2)_3CNH_2]_2$ ($NH_2V_6$) further confirms the presence of these units within the material. Solid-state CP-MAS $^{13}$C NMR reveals POM-bound trisBTA linkers in the product as indicated by a shift in the alcohol methylene peak from 58 ppm to 84 ppm (FIGS. 1A and B). Static light scattering measurements determined the average molecular weight of Q-BTAV$_6$ to be 1586±33 kDa indicating the average polymer is comprised of roughly 1000 monomer units. Deconvolution of the $^{13}$C NMR peaks estimates a ratio of 4 hexavanadate-bound to 3 unbound methylene carbons, and elemental analysis of Q-BTAV$_6$ suggests a ratio of 1.3 hexavanadate units per trisBTA linker. Together, these data suggest that Q-BTAV$_6$ is an extensively cross-linked polymer. Z-contrast scanning transmission electron microscopy (STEM) and transmission electron microscopy (TEM) reveal the presence of cross-linked fibers in the material.

Q-BTAV$_6$ is designed to be a multifunctional material. One function of Q-BTAV$_6$ is its ability to sequester molecules of interest, forming gels in seconds when exposed to polar aprotic organic liquids. Addition of diethyl ether or toluene to the swollen gel results in release of the solvents from the gel network with accompanying contraction. The material retains its gelation capability even after multiple swelling/contraction cycles. ATR FT-IR studies demonstrate that gel formation is mediated by hydrogen-bonging interactions between Q-BTAV$_6$ and the solvent. This hydrogen-bonding behavior is observed in trisBTA-based molecules as well as in other functionalized POMs, however this is the first example of a hexavanadate-based organogelator.

Considering high toxicity of G-agents, DMMP (dimethyl methylphosphonate) is used experimentally because of its similar chemical structure and much lower toxicity. The swelling behavior of Q-BTAV$_6$ was demonstrates when exposed to DMMP. The effect of Q-BTAV$_6$ on the hydrolysis of the nerve agent analogue DECP was examined. Using $^{31}$P NMR to monitor the reaction, experiments show that Q-BTAV$_6$ catalyzes the hydrolytic breakdown of DECP (FIG. 3). Trials using the trisBTA linker show minor hydrolytic rate enhancements, whereas using an equimolar ratio of the monomer compound (based on $V_6$ units) resulted in an observation of a similar hydrolytic rate as that of Q-BTAV$_6$. This data suggests that the hexavanadate core is catalyzing the hydrolysis of the OP analogue, and that the incorporation of $V_6$ into the polymer retains the catalytic activity in the heterogeneous polymer system.

The material also has built-in redox activity, giving it color-change detection and oxidative decontamination capabilities. In order to demonstrate the applicability of Q-BTAV$_6$ for air-based oxidative removal reactions, studies were conducted on the catalytic oxidation of propane thiol. Thiols are the largest class of odorants present in human environments. This representative thiol is fully oxidized to the corresponding non-odorous disulfide, using only $O_2$ to reoxidize the reduced POM units (FIG. 4). The persistent observation of a green reduced hexavanadate species suggests that reoxidation of Q-BTAV$_6$ by $O_2$ is rate-limiting under these conditions and demonstrates colorimetric detection capabilities of the polymer material. The material is red in its powder state and reddish-orange when dispersed in solvent ($\lambda_{max}$=390 nm), indicative of the oxygen-to-metal charge transfer absorption manifold of a fully-oxidized $[V^V{}_6O_{13}(OR)_6)]^{2-}$ core (R=trisBTA linkers). Upon reduction of the POM, Q-BTAV$_6$ becomes dark green as the peak at 390 nm decreases and a broad peak between 600 and 900 nm increases, attributed to intervalence charge-transfer bands in the reduced POM. Electrochemical studies reveal two accessible redox states corresponding to the fully chemically reversible one-electron reduced states of the hexavanadate clusters. These are likely the relevant redox states that are implicated in the catalytic cycle for the oxidation of PrSH.

The invention claimed is:

1. A polymer material having units comprising hydroxy-terminated branched molecules or dendrimers, and hexavanadate units that coordinate with oxygen atoms in the hydroxy-terminated branched molecules or dendrimers, and counter cations.

2. The polymer material of claim 1, wherein the hydroxy-terminated branched molecules or dendrimer comprise terminal 1,1-tris(hydroxymethyl)methyl or 1,1,1-tris(hydroxyalkyl)methyl group.

3. The polymer material of claim 1, wherein the units comprising hydroxy-terminated branched molecules have of the following structure:

wherein, A is an aromatic or non-aromatic optionally heterocyclic ring, X is a linking group or $[Y]_q$, Y is individually and independently at each occurrence, $CH_2$, NH, O, S, —(C=O)—, m is 1, 2, 3, 4, 5, or 6, n is 1 to 22, and p is 2 or 3, q is 1, 2, 3, 4, 5, 6, 7, or 8.

4. The polymer material of claim 3, wherein n is 1 or 2.

5. The polymer material of claim 3, wherein m is 2, 3, or 4.

6. The polymer material of claim 3, wherein A is phenyl.

7. The polymer material of claim 2, wherein the hydroxy-terminated branched molecule is N,N',N"-tris[tris(hydroxymethyl)methyl]-1,3,5-benzenetricarboxamide.

8. The polymer material of claim 2, wherein the hydroxy-terminated branched molecules are N,N'-bis[tris(hydroxymethyl)methyl]-5-tert-butyl-1,3- benzenedicarboxamide or oxybis[N-tris(hydroxymethyl)methyl]-4,4'-benzenedicarboxamide.

9. The polymer material of claim 1, wherein units comprising a hydroxy-terminated branched molecules or dendrimers are a carboxyl-terminated dendrimer.

10. The polymer material of claim 1, wherein the counter cations are a quaternary ammonium cations.

11. The polymer material of claim 10, wherein the quaternary ammonium cations are selected from tetramethylammonium, tetraethylammonium, tetrapropylammonium, tetrabutylammonium, tetrahexylammonium, tetraoxtylammonium, distearyl dimethyl ammonium, paraquat, diquat, benzalkonium, benzethonium, methylbenzethonium, cetalkonium, cetylpyridinium, cetrimonium, cetrimide, dofanium, stearalkonium, choline, denatonium, cocamidopropyl betaine, and carnitine.

12. The polymer material of claim 11, further comprising a polar aprotic solvent and/or water.

13. An article comprising a solid substrate and a polymer material of claim 10.

14. The article of claim 13, wherein the solid substrate is a piece of clothing, fabric, string, matrix, collagen, leather, paper, polymer, plastic, glass, wood, metal surface, cement, rock, or solid aggregate of minerals or mineraloids.

15. A method of oxidizing an agent comprising exposing the polymer material of claim 10 to an agent comprising a thiol group such that the agent is oxidized.

16. A method of hydrolyzing an agent, comprising exposing the composition of claim 10 to an agent comprising a phosphate ester group such that the agent is hydrolyzed.

17. The polymer material of claim 1 comprising 1000 monomer units.

18. The polymer material of claim 1 having an average molecular weight of 1586 ± 33 kDa.

* * * * *